3,336,079
SEAT BACK ANGLE ADJUSTMENT MECHANISM
Arthur O. Radke, Shorewood, and Norton G. Rades, Milwaukee, Wis., assignors to Bostrom Corporation, Milwaukee, Wis., a corporation of Wisconsin
Filed Nov. 12, 1964, Ser. No. 410,552
4 Claims. (Cl. 297—357)

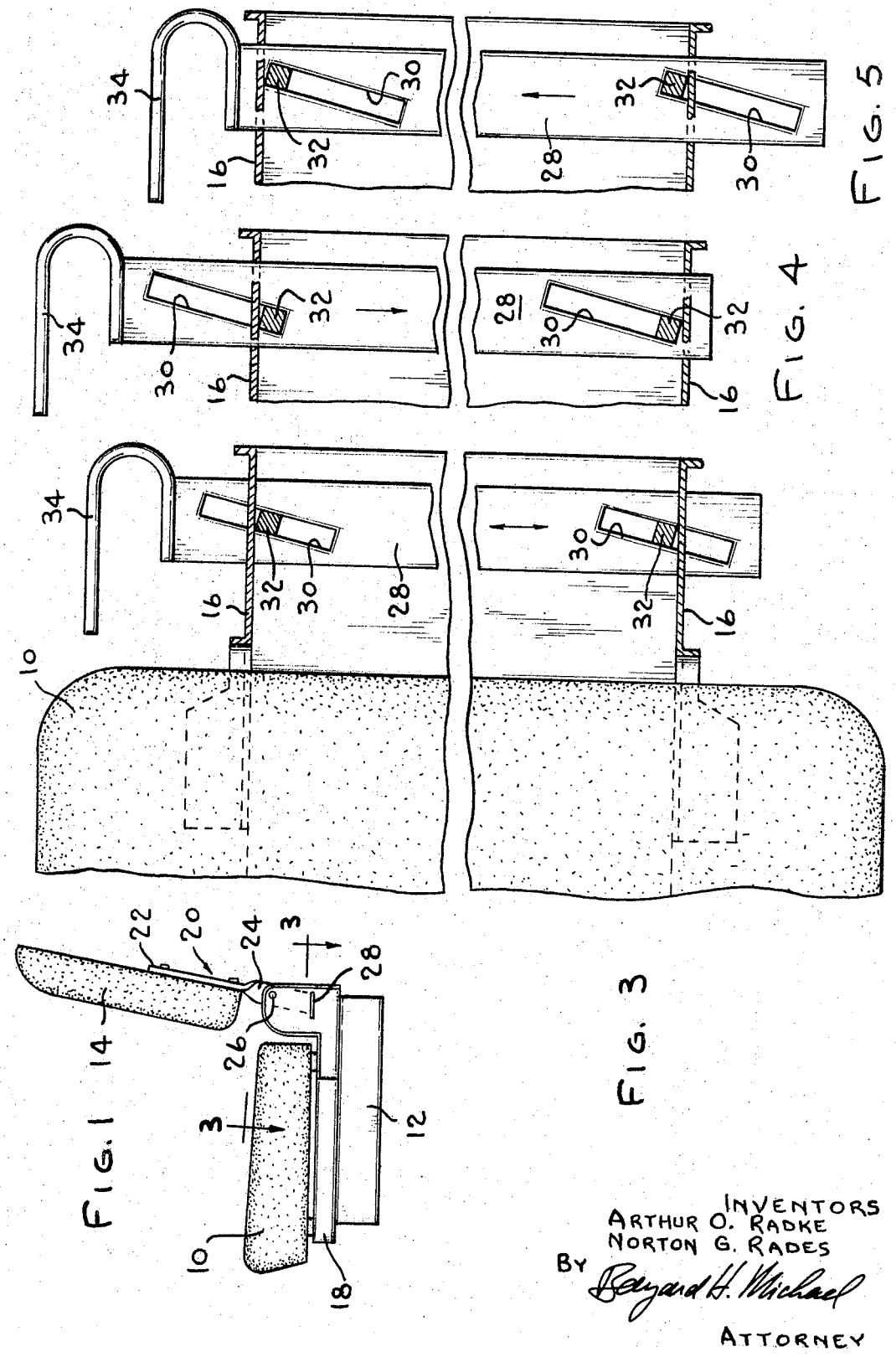

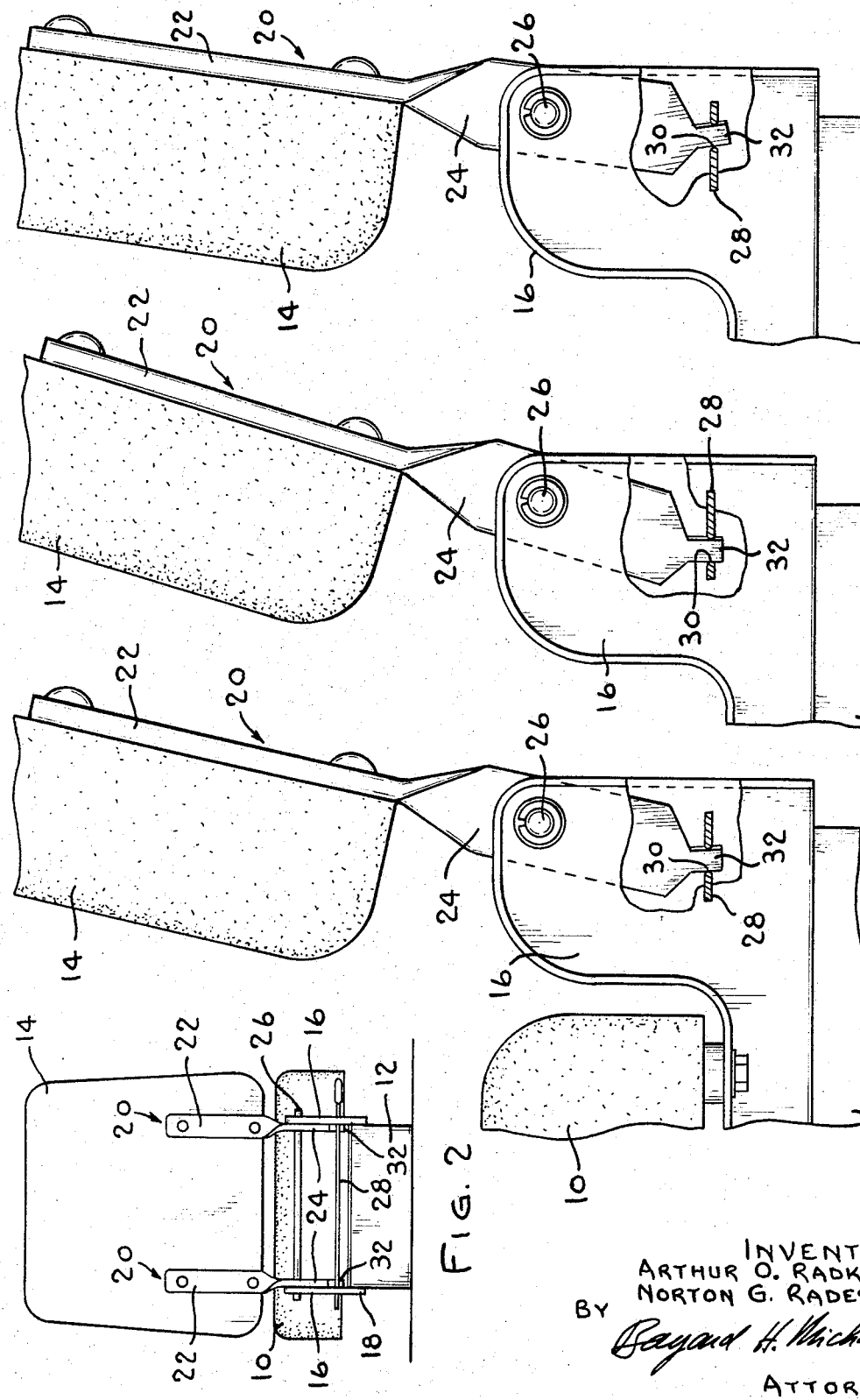

This invention pertains to improvements in vehicle seats and particularly in vehicle seats having back-angle adjustment mechanisms.

The principal object of this invention is to provide a vehicle seat in which the back-angle of the back part may be varied by a relatively simple and inexpensive mechanism.

A further object of this invention is to provide a back-angle adjustment mechanism which will permit the back part to assume any desired back-angle position within a given range.

These objects are essentially attained by providing horizontally and transversely extending slots in a slide member which is fixed to the seat part, and by providing projection members which are slidably engaged with the slots and are connected to the back part. By moving the slide member in the transverse direction to the seat, the fore and aft location at which the projections will be engaged with the slide will change and thereby correspondingly move the back part. No specific locking mechanism for the back part is required since the frictional forces between the projection and the sidewalls of the slot is sufficient to maintain the adjustment in any position along the length of the slot. This mechanism is extremely simple, yet it is capable of providing the complete range of adjustment for which considerably more complex means have been employed heretofore.

Other objects and advantages will be pointed out in, or be apparent from the specification and claims, as will obvious modifications of the single embodiment shown in the drawings, in which:

FIG. 1 is a side plan view of the vehicle seat embodying the present invention;

FIG. 2 is a back plan view thereof;

FIGS. 3–5 are fragmentary cross-sectional top views taken along line 3—3 of FIG. 1 and show the adjustment mechanism in its intermediate, most backward and most forward positions; and FIGS. 6–8 are fragmentary side views of the back part and the adjustment mechanism in the positions corresponding to FIGS. 3–5.

Referring to FIGS. 1 and 2, the vehicle seat shown therein is of common construction and is generally comprised of a seat part 10 fixed to a mounting member 12 and having a back part 14 which is pivotally connected to upstanding side plates 16 of the seat part frame 18.

The back part is provided with two downwardly extending legs 20 having an upper section 22 which lies in the transverse plane of the back part, and a lower section 24 which is at 90 degrees to the section 22 and lies in the fore and aft plane of the seat. The back part is pivotally connected to the seat frame by transversely extending shaft 26 the ends of which are fixed to the side plates 16. A slide member 28 is mounted for reciprocal transverse motion in the lower portion of side plates 16 and is provided with two horizontal slots 30 which extend obliquely to the transverse axis at which the back part is connected to the seat frame. The slots receive downwardly extending projection 32 of the legs 20.

As seen in FIGS. 3–8, reciprocal transverse movement of the slide 28 will cause the projections to ride on the sides of the slots 30 and thereby to change their fore and aft position in respect to the transverse pivotal axis of the back part. This change, of course, changes the back-angle accordingly. The mechanism is located on the bottom rear portion of the seat and is provided with a handle 34 which is easily accessible to the occupant without disembarking from the seat and without diverting his attention from the road or controls of the equipment.

Although but a single embodiment of the present invention has been illustrated and described, it will be apparent to those skilled in the art that various changes and modifications may be made therein without departing from the spirit of the invention or from the scope of the appended claims.

We claim:
1. A back-angle adjustment mechanism for a seat having a seat part and a back part pivotally connected to the seat part, comprising;
   a movable slide fixed to the rear portion of the seat part for reciprocal lineal motion in respect to the seat part and in a direction generally transverse to the seat part;
   two guide members slidably engaged with each other, one of said members being fixed to said slide and the other of said members being fixed to the back part;
   one of said members extending generally horizontally and oblique to the direction of movement of said slide member and the other of said members extending generally vertically and engaging said horizontally extending member at a fore and aft location determined by the tranverse position of said slide in respect to the seat part, the movement of the slide causing a variance of said location to thereby vary the back-angle in accordance with said movement.

2. A back-angle adjustment mechanism of a seat having a seat part and a back part, comprising;
   pivotal means connecting the back part to the seat part for pivotal motion around a transversely extending axis to permit the back part to assume several back-angle positions;
   a slide member fixed to the seat part for reciprocal transverse motion in respect thereto;
   slot means provided in said slide member and extending horizontally and oblique to said transversely extending axis;
   projection means fixed to the back part and slidably engaged with said slot means at a location vertically spaced from said pivotal means;
   said slot means moving said projection means in a fore and aft direction in respect to said pivotal means upon transverse movement of said slide to thereby vary the back angle position of the back member.

3. A vehicle seat, comprising;
   a seat part having an upwardly extending side plate on each side at the back of the seat part;
   a back part pivotally connected to each of said side plates for pivotal motion around a transverse axis to thereby permit the back part to assume several back-angle positions;
   a slide member connected to said side plates below said transverse axis for reciprocal slidable transverse motion;

slot means provided in said member and extending oblique to said transverse axis; and projection means connected to said back part and engaging said slot means to permit variance in said back-angle position upon movement of said slide member.

4. A vehicle seat according to claim 3 wherein said back part is connected to each of said side plates by downwardly extending legs, and wherein said projection means is provided on each of said legs, and said slot means is comprised of two apertures each of which is extending horizontally and transversely to said axis and is in engagement with one of said projection means.

References Cited

UNITED STATES PATENTS

| | | | |
|---|---|---|---|
| 635,452 | 10/1899 | Walton | 297—375 |
| 724,901 | 4/1903 | Luppino | 297—356 |
| 740,967 | 10/1903 | Wylie | 297—356 |
| 1,773,597 | 8/1930 | Myerson | 297—355 |
| 2,728,379 | 12/1955 | Perry | 297—363 |
| 3,024,067 | 3/1962 | Brandoli | 297—355 |
| 3,226,158 | 12/1965 | Strien et al. | 297—361 |

DAVID J. WILLIAMOWSKY, *Primary Examiner.*

FRANK B. SHERRY, *Examiner.*

G. O. FINCH, *Assistant Examiner.*